March 25, 1952    J. D. BENNETT    2,590,362
HYDRAULIC ADAPTER

Filed Sept. 15, 1947    4 Sheets-Sheet 1

John D. Bennett
INVENTOR.

BY

ATTORNEY

March 25, 1952  J. D. BENNETT  2,590,362
HYDRAULIC ADAPTER

Filed Sept. 15, 1947  4 Sheets-Sheet 3

John D. Bennett
INVENTOR.

BY
ATTORNEY

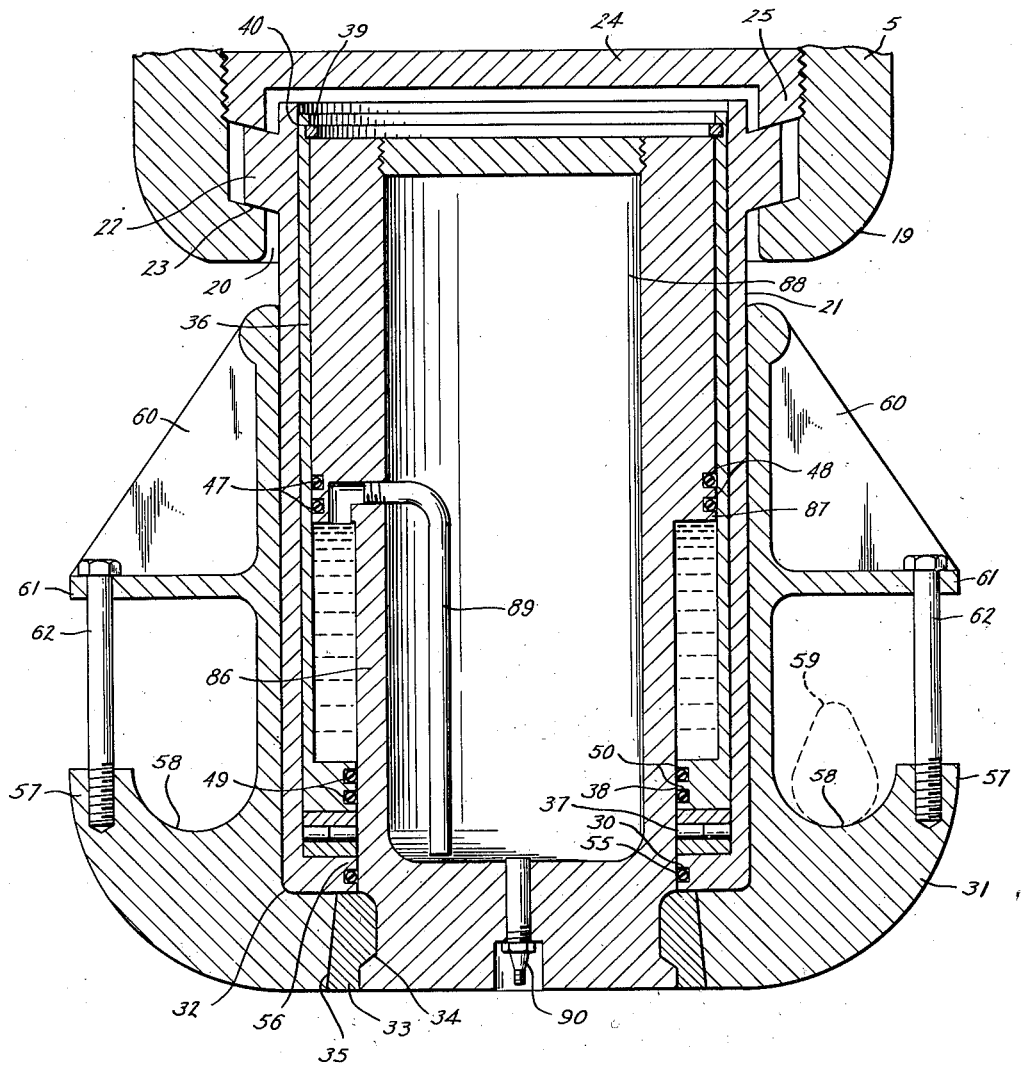

Patented Mar. 25, 1952

2,590,362

UNITED STATES PATENT OFFICE 2,590,362

HYDRAULIC ADAPTER

John D. Bennett, Beaumont, Tex., assignor to International Derrick & Equipment Company, Columbus, Ohio, a corporation of Ohio Application September 15, 1947, Serial No. 773,988

6 Claims. (Cl. 267—1)

The invention concerns a hydraulic adapter for suspending elevator links, swivel hooks and the like from traveling blocks for use in rotary oil well drilling operations.

In my copending application, Serial No. 723,316, filed January 21, 1947, I have disclosed and claimed a traveling block, a spring loaded elevator link adapter and a spring loaded swivel hook which are combined to form a single unit which is relatively short from end to end and is adapted to occupy a minimum of space in the derrick. A single spring loaded adapter is provided, the adapter being designed to receive either a hook member or a clevis, as well as a pair of elevator links. A hook member is provided for use in connection with such adapter, the hook member being interchangeable with a clevis and having a shank portion adapted to be secured to the adapter by a pair of eyes formed integrally therewith.

In my copending application, Serial No. 770,541, filed August 25, 1947, now United States Patent No. 2,513,990, I have disclosed and claimed a spring loaded adapter of the character described having hydraulic shock absorbing means incorporated therein.

The present invention concerns a modification of the apparatus described in my copending applications.

It is an object of the invention to provide a hydraulic adapter which may be substituted for the spring loaded adapters in the apparatus described in my copending applications.

The spring loaded adapters described in my copending applications include precompressed compression springs which are adapted to support the weight of a stand of pipe (about three joints, for example) in the derrick before they are further compressed. Thus when the joints of pipe are being unscrewed the upper joints will be gradually lifted from the lower joints as the joints are unscrewed. This prevents damage to the pipe threads.

In assembling the apparatus decribed in my copending applications the compression springs are designed to support a stand of pipe having a definite weight. Thus on occasions when pipe of lighter or heavier weight is being handled the compression springs are not well adapted to handle the load, and it is not ordinarily practical to substitute one spring for another in order to overcome this difficulty.

When it is desired to unscrew only one or two joints of pipe, or when light tubing is being handled, it may be found that the capacity of the compression spring is excessive. This may result in a jarring effect, when using the apparatus described in my copending application, Serial No. 723,316, due to the action of the compression spring when it is suddenly relieved of the weight of the disconnected pipe, the capacity of the spring being more than enough to support the remaining pipe. It may also result in progressive stripping of the threads of the pipe, the capacity of the compression spring being sufficient to place an excessive strain on the final threads of the pipe being unscrewed.

The jarring effect above mentioned may be sufficient to loosen the clasps of the elevators and cause the elevators to lose their grip on the pipe and permit the pipe to drop, thus creating a hazard to life and property.

The present invention concerns a hydraulic adapter, the capacity of which may be readily adjusted to handle pipe of any given weight. The disadvantages above described may be avoided by use of the hydraulic adapter hereinafter described.

In lowering a string of pipe in the derrick the traveling block may be stopped abruptly, thus placing a severe strain on certain parts of the apparatus due to the weight and momentum of the pipe which is suspended therefrom. The spring loaded adapters described in my copending applications include thrust bearings which would likely become damaged if they were subjected to the full effect of the shock resulting from sudden stopping of the traveling block. The hydraulic adapter of the present invention is designed to avoid this possibility.

The invention will be understood from the following description and the accompanying drawing, in which:

Figs. 4 and 5 illustrate modified forms of the invention which are interchangeable with the portion of the apparatus shown in Fig. 3.

Figure 1:
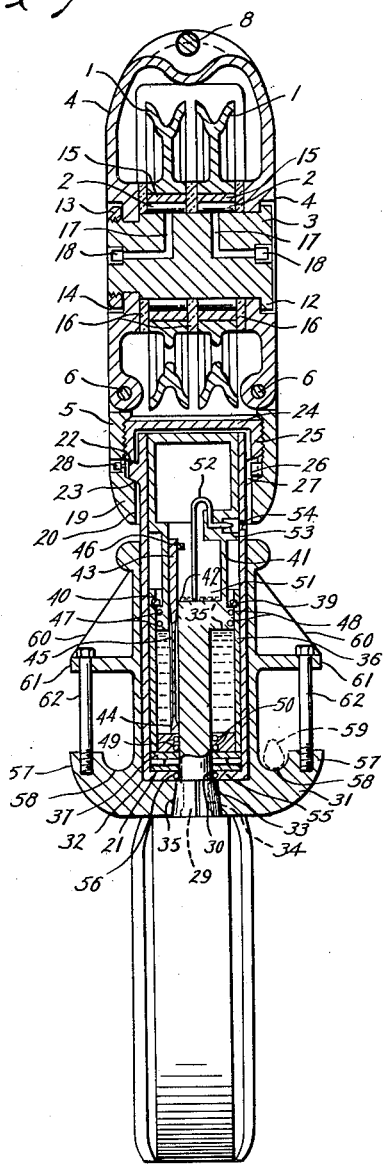
Fig. 1 is a view in elevation, partly in section taken on a median line, showing the combined traveling block, adapter and hook.
Figure 2:
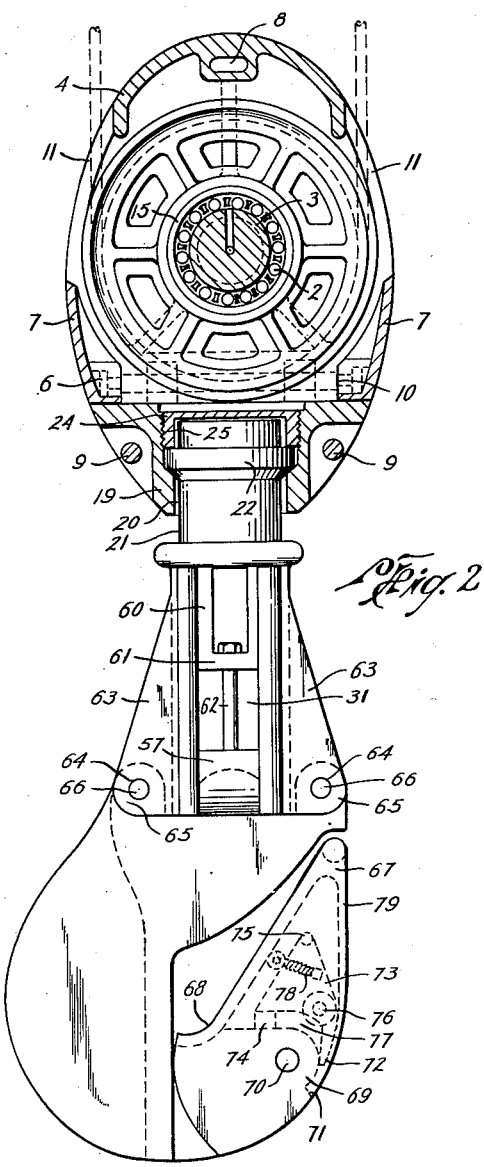
Fig. 2 is a view in elevation taken at right angles to the view shown in Fig. 1. The upper portion only of Fig. 2 is a sectional view taken on a median line.
Figure 3:
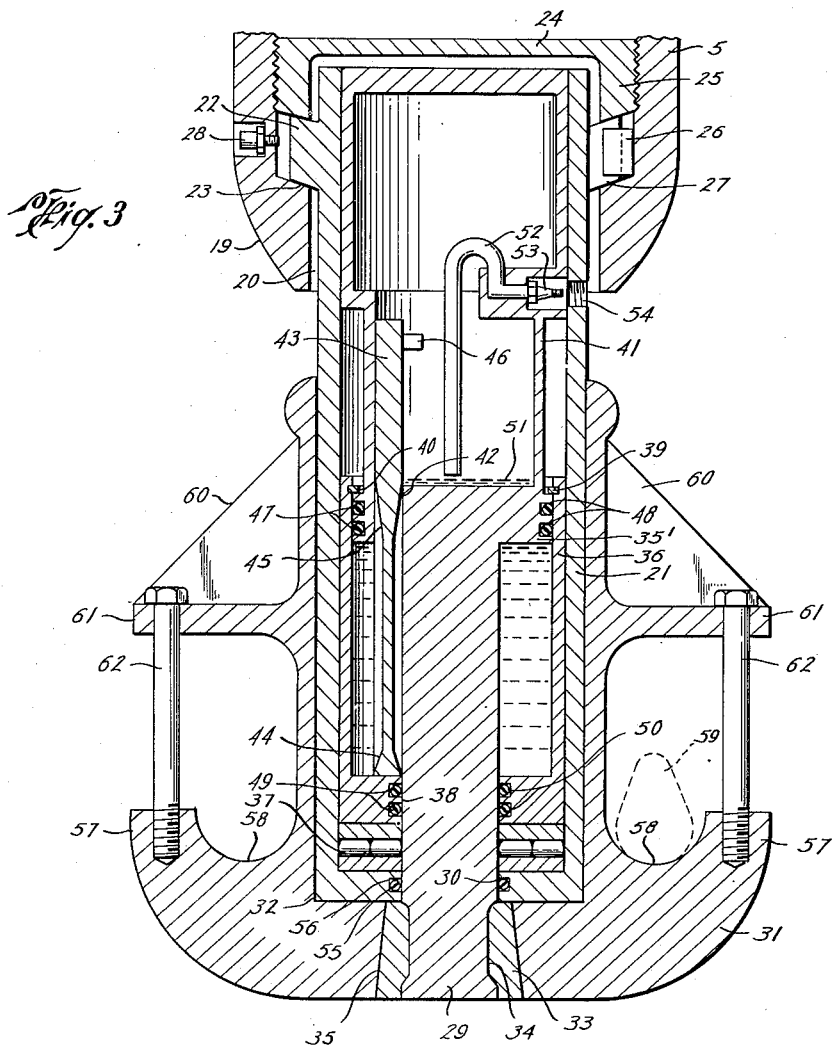
Fig. 3 is an enlarged fragmentary view showing a portion of the apparatus illustrated in Fig. 1.

Referring to Figs. 1, 2 and 3 of the drawing, a pair of sheaves 1 are provided. The sheaves 1 have roller bearings 2 and are journaled on a trunnion 3. A housing 4 substantially encloses the sheaves 1 and provides end supports for the trunnion 3. The housing 4 is open at the bottom and is provided with a bottom closure member 5 adapted to be pivotally and removably secured to the housing 4 by bolts 6. A pair of removable end plates 7, adapted to be secured in place by the bolts 6, are provided. A ring 8 is formed in a recessed portion of the top wall of the housing 4 for use in suspending the traveling block from a wire rope. Pins 9, which are positioned in depressions formed in the ends of the closure member 5, are provided for use as handles.

The walls of the housing 4, the closure member 5 and the end plates 7 are formed with interlocking edges 10 which have aligned openings therein and are fastened together by the bolts 6. The arrangement is such that upon removing one of the bolts 6 the closure member 5 may be swung downwardly, the remaining bolt 6 acting as a hinge.

Openings 11 are provided in the end walls of the housing 4, above the tops of the end plates 7, to receive a wire rope, indicated by the dotted lines.

The trunnion 3 has a shoulder 12 at one end adapted to engage a side wall of the housing 4, and is threaded at the other end to receive a trunnion retaining member 13 which engages the opposite wall of the housing 4. The side walls of the housing 4 are provided with openings 14 adapted to receive the trunnion 3, and are depressed inwardly about the openings 14 so that the ends of the trunnion 3 are flush with the exterior surfaces of the housing 4.

The roller bearings 2 engage the trunnion 3 directly, race rings 15 being provided only between the bearings 2 and the sheaves 1. Spacing rings 16 are provided between the sheaves 1 and between the sheaves 1 and the side walls of the housing 4. Lubricating channels 17 and fittings 18 are provided in the trunnion 3 for lubricating the bearings 2 from the ends of the trunnion 3. The ends of the trunnion 3 are depressed to receive the lubricating fittings 18 so that they do not protrude.

The closure member 5 is formed with a downwardly depressed annular portion 19 having a central opening 20 in the bottom thereof. A cylindrical housing 21 having a shoulder 22 near the top thereof is partially enclosed by the annular portion 19, the lower end of the cylindrical housing 21 extending downwardly thru the central opening 20. A bearing 23 positioned in the bottom of the annular portion 19 is adapted to engage the shoulder 22 of the cylindrical housing 21 and a retaining member 24 secured in the annular portion 19 above the cylindrical housing 21 has a downwardly extending annulus 25 adapted to engage the shoulder 22. The upper and lower surfaces of the shoulder 22 are respectively concave and convex, and the surfaces of the bearing 23 and the annulus 25 are respectively concave and convex, the arrangement being such that the cylindrical housing 21 is capable of a limited pivotal movement. A tongue 26 projecting inwardly from the annular portion 19 and engaging a groove 27 in the shoulder 22 slidably secures the cylindrical housing 21 against rotation with respect to the annular portion 19. A lubricating fitting 28 is provided in the wall of the annular portion 19 for lubricating the joint formed by the upper and lower surfaces of the shoulder 22, the bearing 23 and the annulus 25. The wall of the annular portion 19 is depressed to receive the lubricating fitting 28 so that it does not protrude.

The cylindrical housing 21 is adapted to receive a hydraulic ram as hereinafter described, the hydraulic ram comprising a pin 29 which is disposed vertically within the cylindrical housing 21 and extends thru a central opening 53 formed in the lower end of the cylindrical housing 21.

An adapter member 31 is provided, the adapter member 31 having a cylindrical bore 32 adapted to receive the lower end of the cylindrical housing 21 and being slidable and rotatable with respect thereto. The pin 29 is removably secured at its lower end to the adapter member 31 by a pair of semi-circular wedges 33 which engage an annular groove 34 in the pin 29 and a tapered circular opening 35 in the adapter member 31.

A shoulder 35' is formed on the upper end of the pin 29, the shoulder 35' being adapted to act as a plunger and the arrangement being such that the pin 29 is capable of a reciprocating movement within the cylindrical housing 21 as actuated by weight applied to the adapter member 31 and in response to the action of fluid pressure on the shoulder 35'. A pressure cylinder 36 is receivable within the cylindrical housing 21 and is adapted to be supported by a thrust bearing 37 which is positioned in the lower end of the cylindrical housing 21. The pin 29 extends thru a central opening 38 formed in the lower end of the pressure cylinder 36, and the shoulder 35' is adapted to slidably engage the interior surface of the pressure cylinder 36. A snap ring 39, which is receivable in a groove 40 formed in the upper end of the pressure cylinder 36, is adapted to engage the upper side of the shoulder 35' to limit the upward movement of the pin 29. The under side of the shoulder 35' is adapted to engage the lower end of the pressure cylinder 36 to limit the downward movement of the pin 29.

A pressure cylinder 41, at least the lower portion of which is of smaller diameter than the pressure cylinder 36, extends upwardly from the upper end of the pin 29. The pressure cylinder 41 is formed integrally with the pin 29 and constitutes an extension thereof. The upper end of the pressure cylinder 41 may be of approximately the same diameter as the cylindrical housing 21, the cylindrical housing 21 acting as a guide for the upper end of the pressure cylinder 41.

The pressure cylinders 36 and 41 are adapted to be filled with hydraulic fluids, either gaseous or non-gaseous, and a valved opening 42, which is formed in the shoulder 35', permits the flow of fluids between the pressure cylinders 36 and 41. The size of the opening 42 is controlled by a valve rod 43 which is disposed vertically within the pressure cylinders 36 and 41 and extends thru the opening 42. The lower end of the valve rod 43 is adapted normally to rest on the lower end of the pressure cylinder 36, the pin 29 and the pressure cylinder 41 being movable with respect to the valve rod 43. The valve rod 43 is tapered at its lower end, indicated by the numeral 44, and at a point intermediate its ends, indicated by the numeral 45, the tapered portions 44 and 45 corresponding to the lowermost and uppermost positions of the shoulder 35'. Optionally the valve rod 43 may be fluted intermediate the tapered portions 44 and 45. A guide 46 is provided for the upper end of the valve rod 43.

The pressure cylinder 36 preferably is filled with a non-gaseous fluid such as lubricating oil, although gaseous fluids such as air may be used if desired. Non-gaseous fluids are preferred for the reason that it is easier to provide lubrication and to maintain a seal to prevent escape of the fluid when a non-gaseous fluid is used. Resilient sealing rings 47 are adapted to be inserted in circular grooves 48 formed in the periphery of the shoulder 35', and resilient sealing rings 49 are adapted to be inserted in circular grooves 50 formed in the central opening 38 in the lower end of the pressure cylinder 36, the sealing rings 47 and 49 being adapted to engage the interior surface of the pressure cylinder 36 and the pin 29, respectively, to prevent the escape of hydraulic fluid from the pressure cylinder 36. The pressure cylinders 36 and 41 may be filled with non-gaseous fluid to a level indicated by the line 51, which is positioned immediately above the shoulder 35'. The pressure cylinder 41 may be filled with a gaseous fluid such as air. If desired the pressure cylinder 41 may be filled with an inert gas such as nitrogen or carbon dioxide to avoid the possibility of combustion of the non-gaseous fluid in the pressure cylinder 36 due to heat generated by compression. Both gaseous and non-gaseous fluids may be admitted to the pressure cylinders 36 and 41 thru a filler tube 52 which is disposed vertically within the pressure cylinder 41 and is connected to a valved inlet 53. The fluid level indicated by the line 51 corresponds to the position of the lower end of the filler tube 52. The upper end of the filler tube 52 is turned down to form a liquid seal adjacent the valved inlet 53. The valved inlet 53 may include a check valve of the type ordinarily used in pneumatic tires. Alternatively it may include a ball check valve of conventional design. A threaded opening 54 is formed in the cylindrical housing 21 adjacent the valved inlet 53, and a plug (not shown) may be inserted in the threaded opening 54 when the valved inlet 53 is not in use.

In filling the pressure cylinders 36 and 41 with hydraulic fluids an excess of non-gaseous fluid is first admitted thru the filler tube 52. Gaseous fluid is then admitted thru the filler tube 52 until considerable pressure has developed in the pressure cylinders 36 and 41. This causes the pin 29 to be lifted by fluid pressure to its uppermost position, thereby closing the opening 42. The valved inlet 53 is then opened (by depressing a valve core, for example), and the excess of non-gaseous fluid is forced out thru the filler tube 52 by the gas pressure in the pressure cylinder 41. Thereafter gaseous fluid is again admitted thru the filler tube until a predetermined pressure has been established in the pressure cylinder 41.

The pressure in the pressure cylinders 36 and 41 tends to become equalized. When the pin 29 is forcibly depressed, as by weight applied to the adapter member 31, the pressure in the pressure cylinder 36 is thereby increased, the valve rod 43 is lifted by fluid pressure acting upon the tapered portion 45, and hydraulic fluid is caused to flow from the pressure cylinder 36 to the pressure cylinder 41. Then when the weight is removed from the adapter member 31 the pressure in the pressure cylinder 36 is thereby decreased, hydraulic fluid is caused to flow from the pressure cylinder 41 to the pressure cylinder 36 and the pin 29 is lifted by fluid pressure acting upon the under side of the shoulder 35'.

The adapter member 31 is yieldably and rotatably supported with respect to the cylindrical housing 21. The fluid pressure in the pressure cylinders 36 and 41 is ordinarily sufficient to support the weight of a stand of pipe (about three joints, for example) in the derrick before the pin 29 is depressed. Thus when the joints of pipe are being unscrewed the upper joints will be gradually lifted from the lower joints as the joints are unscrewed. This prevents damage to the pipe threads. The fluid pressure in the pressure cylinders 36 and 41 may be adjusted in advance to compensate for the weight of the pipe being handled.

As the shoulder 35' approaches the tapered portions 44 and 45 of the valve rod 43 the valved opening 42 is gradually closed. This results in a cushioning effect and tends to absorb shock, the pin 29 being gradually stopped as it approaches either the uppermost or lowermost limit of its vertical movement.

The thrust bearing 37 may be lubricated with grease. A resilient sealing ring 55 may be inserted in a circular groove 56 formed in the central opening 30 in the lower end of the cylindrical housing 21, the sealing ring 55 being adapted to engage the pin 29 and prevent the loss of grease from the thrust bearing 37.

A pair of lugs 57 positioned on opposite sides of the adapter member 31 have notches 58 formed therein adapted to receive a pair of elevator links, one of which is indicated at 59. A second pair of lugs are positioned directly above the lugs 57. Each of the last mentioned lugs consists of a pair of longitudinal ribs 60 joined at their lower ends by a transverse portion 61. Screws 62 inserted thru openings in the transverse portions 52 engage the lugs 57 and are adapted to retain the elevator links 59 in the spaces between the upper and lower lugs.

Two pairs of longitudinal ribs 63 are positioned on opposite sides of the adapter member 31 and extend laterally from the adapter member 31 at right angles to the lugs 57. Each pair of ribs 63 is adapted to receive between them one of a pair of eyes, such as the eyes 64 of a hook member or the eyes of a clevis (not shown). A hook member is provided, the hook member having a shank portion 65 adapted to be secured to the adapter member 31 by the eyes 64, which are formed integrally therewith. Bolts 66 are inserted thru openings in the ribs 63 and the eyes 64 of the hook member.

As shown by the dotted lines, the back of the hook member is shaped generally like a saddle, being curved inwardly and adapted to engage a pipe, the pipe acting as a guide for aligning the elevators for ease of engagement of the elevators to the pipe.

The forward end of the hook member is provided with a locking arm 67 which is adapted to extend outwardly to receive a swivel bail or the like, and when in closed position is adapted to support the swivel bail in a notch 68 formed in the lower end thereof. The locking arm 67 is shaped generally like a saddle and is adapted to fit over a snout 69 which constitutes the forward end of the hook member. The locking arm 67 is pivotally secured intermediate its ends to the snout 69 by a pin 70. A shoulder 71 on the lower side of the snout 69 engages the body of the locking arm 67 at 72 and supports the locking arm 67 in open position. A latching member, which is formed by a pair of triangular pieces 73 connected by a cross piece 74 and a pin 75, is pivotally secured within the locking arm 67 by a pin 76, and the cross piece 74 is adapted to engage a lug 77 formed on the end of the snout 69, which is straddled by the latching member, when the locking arm 67 is in closed position.

The cross piece 74 is retained in engagement with the lug 77 by a spring 78, and may be disengaged by inserting a hook thru an opening 79 in the body of the locking arm 67 and contacting the pin 75.

Figure 4:
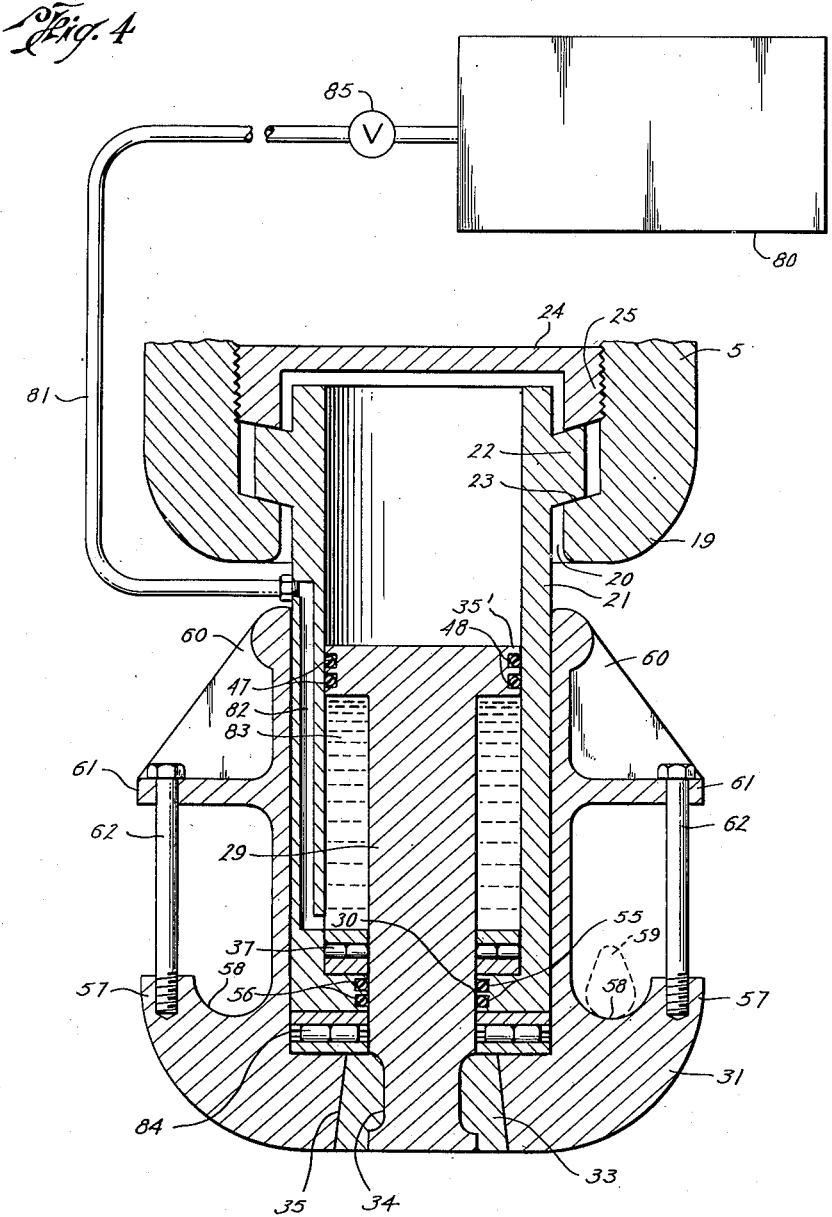

Fig. 4 illustrates a modified form of the invention in which a pressure tank 80 is substituted for the pressure cylinder 41 shown in Fig. 3. The pressure tank 80 may be located on the derrick floor, for example, or at some other remote point, and may be connected to the interior of the cylindrical housing 21 by a flexible conduit 81 and a channel 82 which is formed in the wall of the cylindrical housing 21. The pressure cylinder 36 is eliminated and a pressure chamber 83 is formed directly within the cylindrical housing 21 and surrounding the pin 29. The shoulder 35', which is formed on the upper end of the pin 29, slidably engages the interior surface of the cylindrical housing 21. The under side of the shoulder 35' is adapted to engage the thrust bearing 37 directly to limit the downward movement of the pin 29. A thrust bearing 84 is inserted between the adapter member 31 and the lower end of the cylindrical housing 21. A control valve 85 is inserted in the conduit 81, and the pressure in the pressure chamber 83 may be adjusted by remote control to compensate for variations in the weight of the pipe being handled.

Fig. 5 illustrates a modified form of the invention in which a cylindrical plunger 86 is substituted for the pin 29. A shoulder 87 is formed on the cylindrical plunger 86 and is adapted to slidably engage the interior surface of the pressure cylinder 36. A pressure chamber 88 is formed within the cylindrical plunger, the pressure chamber 88 corresponding to the pressure cylinder 41 illustrated in Fig. 3. The position of the pressure chamber 88 within the cylindrical plunger 86 permits the length of the apparatus to be further decreased. A conduit 89 connects the pressure chamber 88 with the pressure cylinder 36. A valved inlet 90 is provided in the lower end of the cylindrical plunger 86, and the pressure in the pressure chamber 88 may be adjusted as necessary to compensate for variations in the weight of the pipe being handled.

The invention may be modified in various ways without departing from the spirit and scope thereof.

I claim:

1. A hydraulic adapter for suspending elevator links, swivel hooks and the like from traveling blocks comprising a cylindrical housing, a thrust bearing positioned in the lower end of the cylindrical housing, a pressure cylinder receivable in the cylindrical housing and adapted to be rotatably supported by the thrust bearing, an adapter member having a cylindrical bore receiving the lower end of the cylindrical housing and being slidable and rotatable with respect thereto, a hydraulic ram receivable in the cylindrical housing and including a pin which is secured at its lower end to the adapter member and extends upwardly thru central openings formed in the lower ends of the cylindrical housing and the pressure cylinder, a shoulder formed on the pin adjacent its upper end and slidably engaging the interior surface of the pressure cylinder, and a closed pressure cylinder formed integrally with the pin and extending upwardly therefrom, the second pressure cylinder being connected with the portion of the first mentioned pressure cylinder below said shoulder by a valved opening, the pressure cylinders being adapted to be filled with fluids and the hydraulic ram being capable of a reciprocating movement as actuated by weight applied to the adapter member and in response to the action of fluid pressure.

2. A hydraulic adapter for suspending elevator links, swivel hooks and the like from traveling blocks comprising a cylindrical housing, a thrust bearing positioned in the lower end of the cylindrical housing, a pressure cylinder receivable in the cylindrical housing and adapted to be rotatably supported by the thrust bearing, an adapter member having a cylindrical bore receiving the lower end of the cylindrical housing and being slidable and rotatable with respect thereto, a hydraulic ram receivable in the cylindrical housing and including a pin which is secured at its lower end to the adapter member and extends upwardly thru central openings formed in the lower ends of the cylindrical housing and the pressure cylinder, a shoulder formed on the pin adjacent its upper end and slidably engaging the interior surface of the pressure cylinder, and a closed pressure cylinder formed integrally with the pin and extending upwardly therefrom, at least the lower portion of the second pressure cylinder being of smaller diameter than the first mentioned pressure cylinder, the second pressure cylinder being connected with the portion of the first mentioned pressure cylinder below said shoulder by a valved opening.

3. A hydraulic adapter for suspending elevator links, swivel hooks and the like from traveling blocks comprising a cylindrical housing, a thrust bearing positioned in the lower end of the cylindrical housing, a pressure cylinder receivable in the cylindrical housing and adapted to be rotatably supported by the thrust bearing, an adapter member having a cylindrical bore receiving the lower end of the cylindrical housing and being slidable and rotatable with respect thereto, a hydraulic ram receivable in the cylindrical housing and including a pin which is secured at its lower end to the adapter member and extends upwardly thru central openings formed in the lower ends of the cylindrical housing and the pressure cylinder, a shoulder formed on the pin adjacent its upper end and slidably engaging the interior surface of the pressure cylinder, and a closed pressure cylinder formed integrally with the pin and extending upwardly therefrom, the second pressure cylinder being connected with the portion of the first mentioned pressure cylinder below said shoulder by a valved opening, the pressure cylinders being adapted to be filled with fluids and the hydraulic ram being capable of a reciprocating movement as actuated by weight applied to the adapter member and in response to the action of fluid pressure, the under side of the shoulder being adapted to engage the lower end of the first mentioned pressure cylinder to limit the downward movement of the pin and the upper side of the shoulder being adapted to engage retaining means secured to the first mentioned pressure cylinder to limit the upward movement of the pin.

4. A hydraulic adapter for suspending elevator links, swivel hooks and the like from traveling blocks comprising a cylindrical housing, a thrust bearing positioned in the lower end of the cylindrical housing, a pressure cylinder receivable in the cylindrical housing and adapted to be rotatably supported by the thrust bearing, an adapter member having a cylindrical bore receiving the lower end of the cylindrical housing and being slidable and rotatable with respect thereto, a hydraulic ram receivable in the cylindrical housing and including a pin which is secured at its lower end to the adapter member and extends upwardly thru central openings formed in the lower ends of the cylindrical housing and the pressure cylinder, a shoulder formed on the pin adjacent its upper end and slidably engaging the interior surface of the pressure cylinder, and a closed pressure cylinder formed integrally with the pin and extending upwardly therefrom, the second pressure cylinder being connected with the portion of the first mentioned pressure cylinder below said shoulder by a valved opening, the valved opening comprising an opening extending thru the shoulder and a valve rod disposed vertically in the pressure cylinders and extending thru the opening, the valve rod being tapered at points corresponding to the uppermost and lowermost positions of the shoulder.

5. A hydraulic adapter for suspending elevator links, swivel hooks and the like from traveling blocks comprising a cylindrical housing, a thrust bearing positioned in the lower end of the cylindrical housing, a pressure cylinder receivable in the cylindrical housing and adapted to be rotatably supported by the thrust bearing, an adapter member having a cylindrical bore receiving the lower end of the cylindrical housing and being slidable and rotatable with respect thereto, a hydraulic ram receivable in the cylindrical housing and including a pin which is secured at its lower end to the adapter member and extends upwardly thru central openings formed in the lower ends of the cylindrical housing and the pressure cylinder, a shoulder formed on the pin adjacent its upper end and slidably engaging the interior surface of the pressure cylinder, and a closed pressure cylinder formed integrally with the pin and extending upwardly therefrom, the second pressure cylinder being connected with the portion of the first mentioned pressure cylinder below said shoulder by a valved opening, the second pressure cylinder being adapted to be filled with a gaseous fluid and the first mentioned pressure cylinder being adapted to be filled with a non-gaseous fluid, and means for filling the pressure cylinders with fluids and maintaining a desired level of non-gaseous fluid comprising a valved opening in the upper portion of the second pressure cylinder communicating with an opening in the cylindrical housing and a filler tube extending upwardly from a point corresponding to the desired level and communicating with the valved opening, the filler tube being turned down at its upper end to form a liquid seal adjacent the valved opening.

6. A hydraulic adapter for suspending elevator links, swivel hooks and the like from traveling blocks comprising a cylindrical housing, a thrust bearing positioned in the lower end of the cylindrical housing, a pressure cylinder receivable in the cylindrical housing and adapted to be rotatably supported by the thrust bearing, an adapter member having a cylindrical bore receiving the lower end of the cylindrical housing and being slidable and rotatable with respect thereto, a hydraulic ram receivable in the cylindrical housing and including a pin which is secured at its lower end to the adapter member and extends upwardly thru central openings formed in the lower ends of the cylindrical housing and the pressure cylinder, a shoulder formed on the pin adjacent its upper end and slidably engaging the interior surface of the pressure cylinder, and a closed pressure cylinder connected with the portion of the first mentioned pressure cylinder below said shoulder by a valved opening, the pressure cylinders being adapted to be filled with fluids and the hydraulic ram being capable of a reciprocating movement as actuated by weight applied to the adapter member and in response to the action of fluid pressure.

JOHN D. BENNETT.

REFERENCES CITED

The following references are of record in the file of this patent:

UNITED STATES PATENTS

| Number | Name | Date |
| --- | --- | --- |
| 1,528,588 | Timbs | Mar. 3, 1925 |
| 1,725,902 | Driscoll | Aug. 27, 1929 |
| 1,918,699 | Gruss | July 18, 1933 |
| 2,363,485 | Down | Nov. 28, 1944 |
| 2,366,248 | Focht | Jan. 2, 1945 |
| 2,417,581 | Aldred, Jr. | Mar. 18, 1947 |